US012619610B2

(12) United States Patent
Avdal

(10) Patent No.: US 12,619,610 B2
(45) Date of Patent: May 5, 2026

(54) ESTIMATING COST OF QUERY EXECUTION ON A SET OF DATA ACCESSIBLE TO A COMPUTING SYSTEM

(71) Applicant: Crowdstrike, Inc., Sunnyvale, CA (US)

(72) Inventor: Hazim Avdal, Cincinnati, OH (US)

(73) Assignee: Crowdstrike, Inc., Sunnyvale, CA (US)

( * ) Notice: Subject to any disclaimer, the term of this patent is extended or adjusted under 35 U.S.C. 154(b) by 0 days.

(21) Appl. No.: 18/898,201

(22) Filed: Sep. 26, 2024

(65) Prior Publication Data

US 2026/0087013 A1 Mar. 26, 2026

(51) Int. Cl.
*G06F 15/16* (2006.01)
*G06F 16/2453* (2019.01)
(52) U.S. Cl.
CPC .............................. *G06F 16/24545* (2019.01)
(58) Field of Classification Search
None
See application file for complete search history.

(56) References Cited

U.S. PATENT DOCUMENTS

| | | | |
|---|---|---|---|
| 11,853,359 B1 | 12/2023 | Mortensen et al. | |
| 2003/0097355 A1 | 5/2003 | Kapitskaia et al. | |
| 2005/0223019 A1* | 10/2005 | Das .................... | G06F 16/2462 707/999.102 |

| | | | |
|---|---|---|---|
| 2008/0091623 A1 | 4/2008 | Idicula et al. | |
| 2010/0153431 A1* | 6/2010 | Burger ................ | G06F 16/2462 707/769 |
| 2011/0313999 A1* | 12/2011 | Bruno ............... | G06F 16/24542 707/718 |
| 2020/0134070 A1* | 4/2020 | Sidoti ............... | G06F 16/24542 |
| 2021/0124744 A1 | 4/2021 | Gladwin et al. | |
| 2022/0391427 A1* | 12/2022 | Little .................. | G06F 16/9032 |
| 2022/0414100 A1* | 12/2022 | Carter ................ | G06F 16/2471 |

FOREIGN PATENT DOCUMENTS

| | | |
|---|---|---|
| CN | 104598454 A | 5/2015 |
| CN | 104834754 A | 8/2015 |
| WO | 2013049715 A1 | 4/2013 |

* cited by examiner

*Primary Examiner* — Alex Gofman

(74) *Attorney, Agent, or Firm* — Elliott, Ostrander & Preston, P.C.

(57) ABSTRACT

Estimating a cost of executing a query on a set of data involves executing logic to: estimate a size of each datum in the set of data; receive a query specifying a value for a first datum and a plurality of additional datum in the set of data associated with the first datum, and a maximum number of first datum to be retrieved from the set of data that have the specified value; estimate a cost of executing the query based on the maximum number of first datum to be retrieved from the set of data that have the specified value, the plurality of additional datum associated with the first datum, and the estimated size of the first datum and each of the additional datum associated with the first datum; and execute the query on the set of data responsive to the estimated cost.

20 Claims, 4 Drawing Sheets

/ 102

Select samples for each datum in the set of data
202

↓

Measure size of samples for each datum in the set of data
204

↓

Estimate mean, median or mode, of size for each datum in the set of data
206

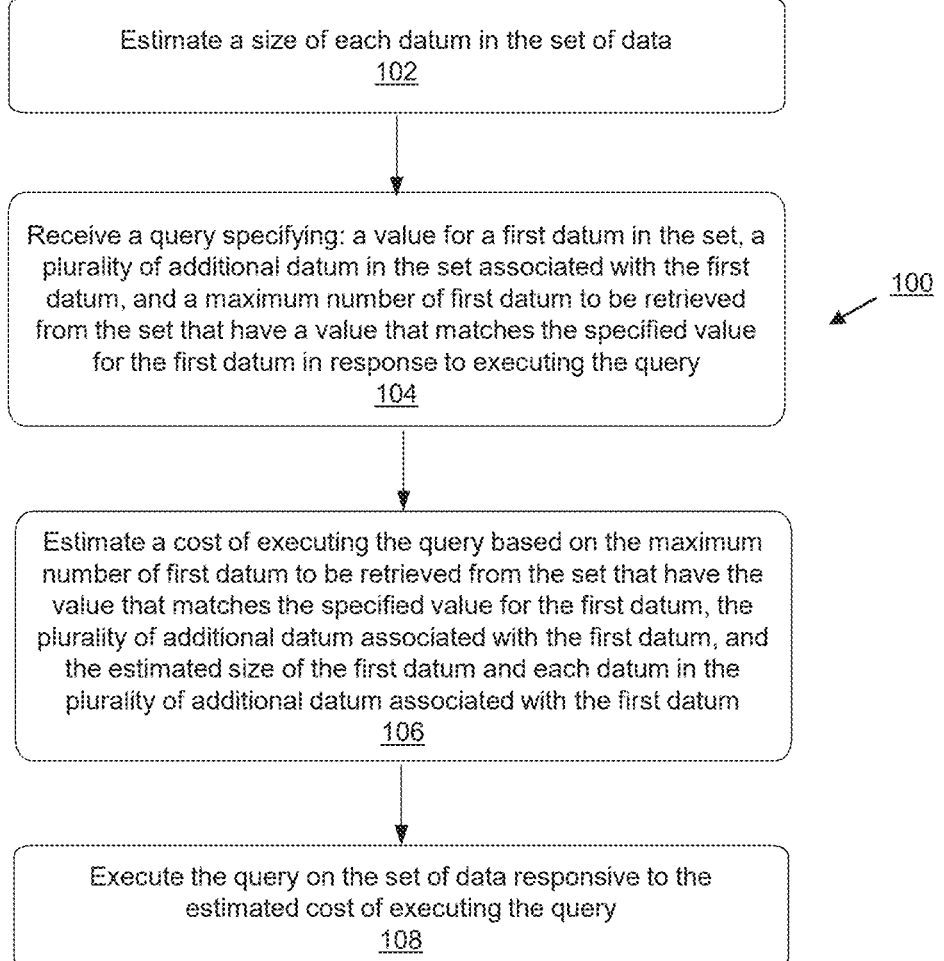

Estimate a size of each datum in the set of data
102

Receive a query specifying: a value for a first datum in the set, a
plurality of additional datum in the set associated with the first
datum, and a maximum number of first datum to be retrieved
from the set that have a value that matches the specified value
for the first datum in response to executing the query
104

100

Estimate a cost of executing the query based on the maximum
number of first datum to be retrieved from the set that have the
value that matches the specified value for the first datum, the
plurality of additional datum associated with the first datum, and
the estimated size of the first datum and each datum in the
plurality of additional datum associated with the first datum
106

Execute the query on the set of data responsive to the
estimated cost of executing the query
108

FIG. 1

ESTIMATING COST OF QUERY EXECUTION ON A SET OF DATA ACCESSIBLE TO A COMPUTING SYSTEM

TECHNICAL FIELD

Embodiments relate to digital computing systems, particularly to estimating a size of a query on a set of data and a cost of executing the query on the set of data based on the estimated query size.

BACKGROUND

Computing systems that receive complex and/or adjustable queries, such as user queries directed to a database system, tend to have a variable resource utilization schedule. In other words, the amount of computing resources, hardware, databases, servers, memory constraints, network resources, etc., in use at a given point in time may vary according to time of day and/or other actions or applications using the computing system resources. Estimating the computational cost of such queries has many useful applications such as enforcing query throttling (i.e., controlling the number of queries the computer system will accept in a given period of time to prevent overwhelming or overloading the system), query rate-limiting (i.e., limiting the number of queries from a particular user or client over a given period of time), and Cost-Of-Goods-Sold (COGs) bounding (i.e., limiting the number of queries from a particular user or client based on the computational and/or financial costs associated with providing responses to the user/client queries), among other practical considerations.

Rate limiting and throttling are well-known bounding techniques in software development. Query size estimation is also a common practice in some database systems, such as MySQL. Typically, these practices use static bounding or rely on the shape of the query itself to perform query size estimations.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 is a flowchart 100 describing aspects of embodiments of the invention.

DETAILED DESCRIPTION

Figures 2, 4:
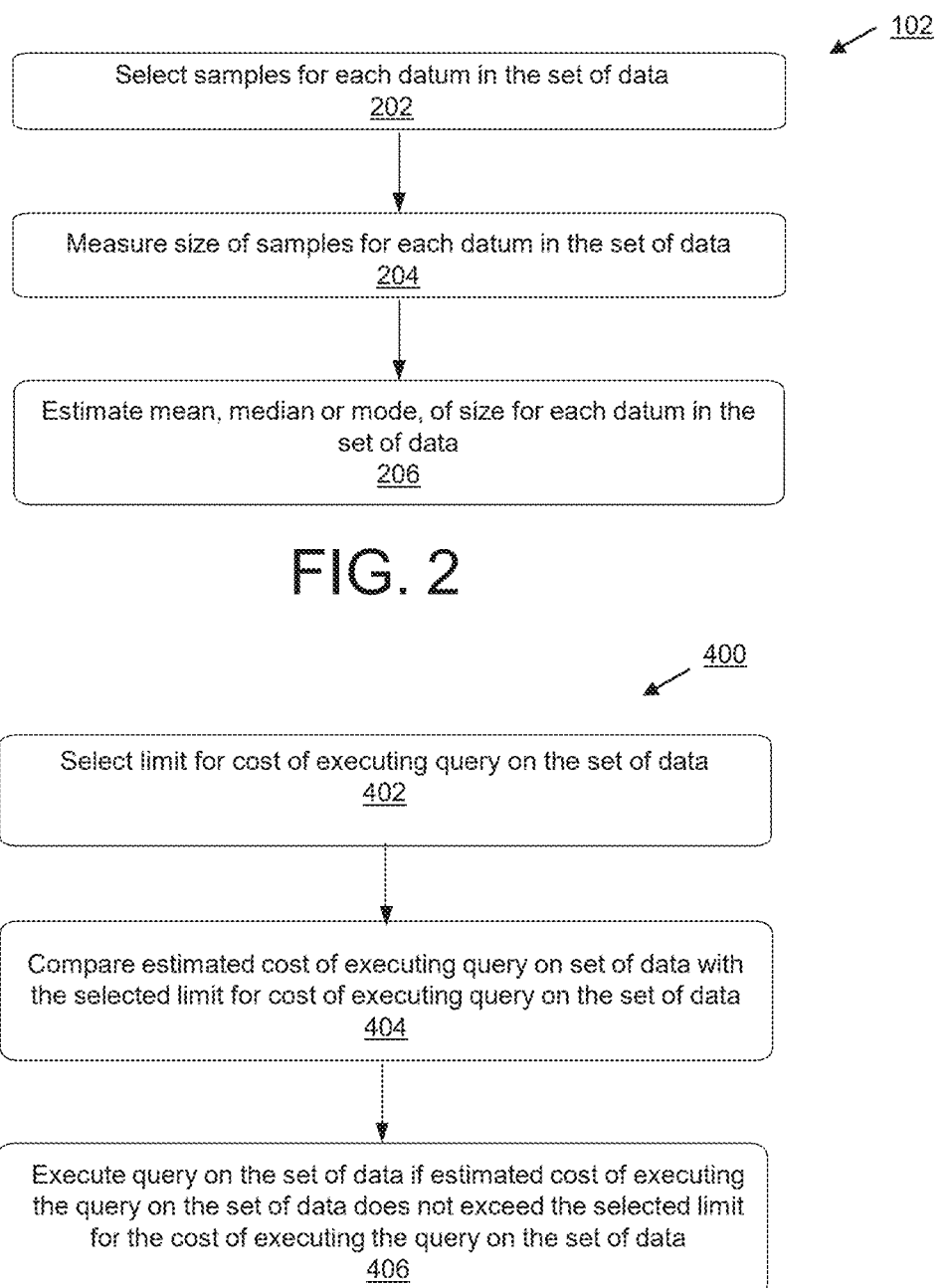
FIG. 2 is a flowchart 102 describing aspects of embodiments of the invention.
FIG. 4 is a flowchart 400 describing aspects of embodiments of the invention.

Embodiments estimate query size by first performing an empirical analysis of the shape of the data in a data store (rather than only analyzing the shape of the query submitted to the data store), and then estimating the size of the query, for example, by estimating the number of bytes expected to be fetched from the data store in response to the query, based on the empirical analysis of the shape of the data. The empirical analysis may be performed repeatedly or continuously so that the analysis is current and up to date. In short, the disclosed embodiments involve dynamically estimating a cost of executing a query on a set of data, e.g., the disclosed embodiments involve estimating the cost to fetch the number of bytes expected to be fetched from the data store in response to the query, given the recent or current shape of the data in the data store.

One example context or application for the disclosed embodiments is cybersecurity. Embodiments can be applied to a threat detection storage system which responds to user queries by returning a varying set of "facets" per threat detection query, e.g., a facet of a threat detection document. In such an application, clients provide a predicate that will select a subset of the threat detection data, a set of facets to return per match, as well as the number of matches to return per request. As such, the cost of each query varies significantly based on user-controlled parameters. Predicting the cost of a particular query is not only important for efficient resource allocation, but neglecting or ignoring the cost of the query makes such a service vulnerable to Denial of Service (DoS) attacks. While this can be mitigated by setting static upper bounds on user-provided inputs, a dynamic model ensures higher resource utilization compared to a static model. Of course, embodiments of the invention are not limited to the aforesaid example application.

As disclosed in further detail below, embodiments execute logic to: estimate a size of each datum in the set of data; receive a query specifying a value for a first datum and a plurality of additional datum in the set of data associated with the first datum, and a maximum number of first datum to be retrieved from the set of data that have the specified value; estimate a cost of executing the query based on the maximum number of first datum to be retrieved from the set of data that have the specified value, the plurality of additional datum associated with the first datum to be retrieved, and the estimated size of the first datum and each of the additional datum associated with the first datum; and execute the query on the set of data responsive to the estimated cost.

An example embodiment is described below with reference to flowchart 100 in FIG. 1. According to the example, a computer-implemented method is performed by a computer system having at least a processor and a memory therein to execute instructions for estimating a cost of querying a set of data maintained in an electronic data store accessible to the system.

The embodiment executes logic block 102 to estimate a size of each datum in the set of data maintained in the electronic data store. For example, presume the set of data includes a plurality of records. Each record comprises a plurality of fields. The records are indexed and searched (and may be sorted) according to a first field or datum, e.g., "customer_name". The records include a plurality of additional fields or datum. The fields may be named, for example, "host_id", "IP_address", and "executable_hash" (a hash of an executable file). Each field may have a fixed or variable size. One measure of the size of each field is the length of the field. The length of the field may be measured, for example, in bytes. For example, the field customer_name may be a variable length field of a plurality of bytes depending on the value assigned to customer_name. In one record, the size of the customer_name field may be just a few bytes, in another record, the size of the customer_name field may be tens of bytes, and in yet another record, the customer_name field may be 256 bytes in length, depending on the values assigned to this field in the different records. Similarly, host_id may be a variable length datum in each record depending on the assigned value, while the IP_address and executable_hash fields may be fixed length fields of four and 64 bytes, respectively, regardless of the values assigned to these datum.

With reference to further details about logic block 102 in FIG. 2, if the data set is very large, it may be appropriate, at logic block 202, to sample selected datum in the data set and estimate a size of the sampled datum. Thus, embodiments can execute logic to estimate the size of each datum across a plurality of samples of each datum in the set of data. According to one embodiment, the logic selects or draws a significantly large sample, uniformly, and at random. Thus, embodiments can execute logic to estimate the size of each datum across a plurality of uniformly distributed and randomly chosen samples of each datum in the set of data.

Then, the size of each of the samples for each datum is measured at logic block 204, and an average size for each sampled datum is calculated at logic block 206. For example, the average size of each datum may be estimated based on the mean, median, or mode of the size of each datum. Thus, embodiments can execute logic to estimate one of a mean, a median, and a mode, for the size of at least one datum across the plurality of samples of the at least one datum in the set of data.

According to an embodiment, the random sampling of datum in the set of data, and the analysis of the size of the sampled datum in the set of data, may be performed on a periodic or continuous basis, for example, as a background process executing on the computer system, so that the size estimates are up to date and representative of the current state of the set of data.

Referring again to FIG. 1, logic block 104 may receive via an interface of the system (e.g., an API, webAPI, REST API, or user interface) a query specifying a value for a first datum in the set of data. The datum may be in a document, a JSON document, a log file, a table, or in a database record. The query may also request the return of a plurality of additional datum in the set of data associated with the first datum, and a maximum number of first datum to be retrieved from the set of data that have a value that matches the specified value for the first datum in response to executing the query.

For example, consider a threat detection data store powered by a search engine such as Elasticsearch, which is based on the Lucene library and provides a distributed, multi-tenant-capable full-text search engine with an HTTP web interface and schema-free JSON documents. According to an example embodiment, users can read threat detection data through an interface supporting these queries:

```
{
"limit": 200,
"match": "customer_name='example'",
"include_fields": [
"host_id",
"IP_address",
"executable_hash"
]
}
```

Before fulfilling the request, at logic block 106, a backend service will estimate a cost of executing the query based on the maximum number of first datum to be retrieved from the set of data that have the value that matches the specified value for the first datum, the plurality of additional datum associated with the first datum, and the estimated size of the first datum and each datum in the plurality of additional datum associated with the first datum. For example, an embodiment can execute logic to estimate a number of bytes to be fetched from the electronic data store to execute the query on the set of data. In one example, the first datum is the "customer_name" field, the maximum number ("limit") of "customer_name" fields specified in the query is 200, and the additional datum associated with the first datum include the "host_id", IP_address" and "executable_hash" fields. The cost calculation or estimate can be expressed in the following formula:

$$Cost=limit*(expected\_size(host\_id)+expected\_size\\(ip\_address)+expected\_size(executable\_hash))$$

As discussed above, the expected size of each field is estimated to be the average, e.g., the empirical mean, of the range of values it can take. This mean is estimated by drawing a sufficiently large sample uniformly at random from, in this example, Elasticsearch. For example, suppose the sample selected or drew ["host1", "host212", "host100", "host21"] for the host_id field. The expectation of the size of the host_id field then is (5 bytes+7 bytes+7 bytes+6 bytes)/4=6.25 bytes. By performing similar estimations for the other fields, an embodiment arrives at the following cost estimate:

$$Cost=limit*(expected\_size(host\_id)+expected\_size\\(ip\_address)+expected\_size(executable\_hash))\\=200*(6.25\ bytes+11\ bytes+32\ bytes)=9850\ Kb.$$

Suppose a target limit on the query cost is 1 Mb. Since this query is well under the limit, the request will be honored, and logic block 108 executes the query on the set of data responsive to the estimated cost of executing the query.

Note in this example, the expected_size of the first datum, e.g., the "customer_name" field, is absent in the cost calculation. In another example embodiment, this field too could be included in the cost calculation.

Figure 3:
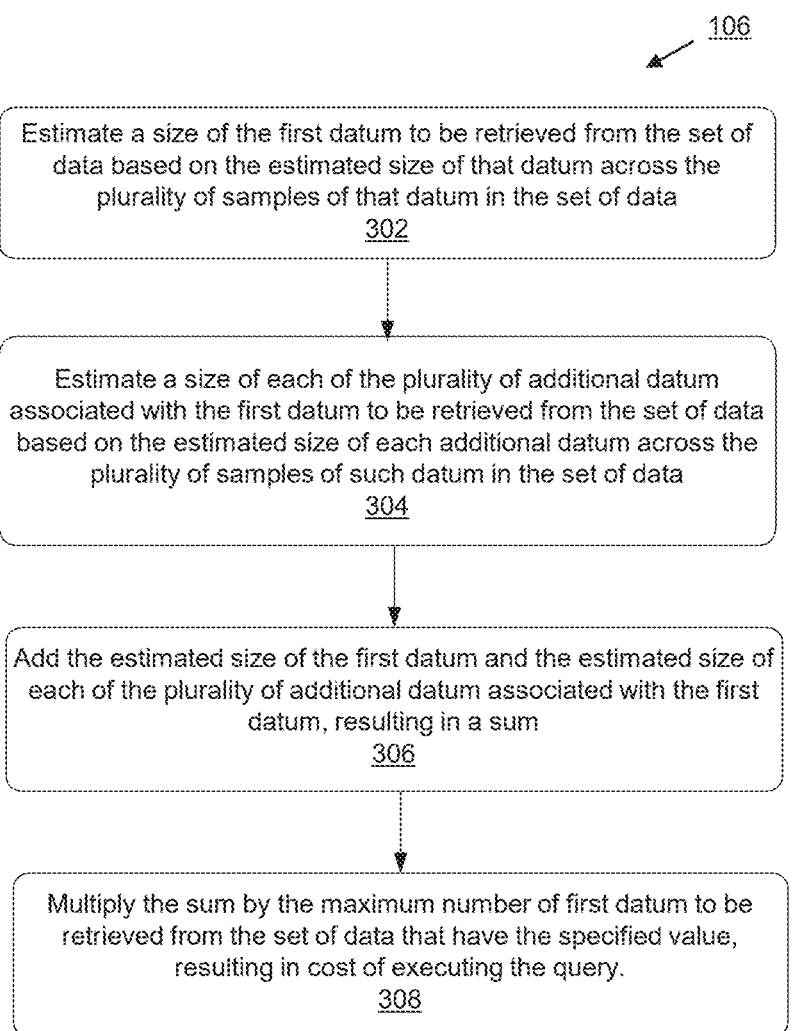
FIG. 3 is a flowchart 106 describing aspects of embodiments of the invention.

With reference to logic block 106, FIG. 3 provides further details of the logic according to an example embodiment. Logic blocks 302 and 304 can be executed to estimate a size of the first datum and each of the plurality of additional datum associated with the first datum based on the estimated size of each datum across the plurality of samples of each datum in the set of data. Next, logic block 306 can be executed to sum the estimated size of the first datum and the estimated size of each of the plurality of additional datum associated with the first datum. Finally, logic block 308 can be executed to multiply the summed estimated size of the first datum and each of the plurality of additional datum associated with the first datum by the maximum number of first datum to be retrieved from the set of data that have the value that matches the specified value for the first datum.

With reference to flowchart 400 in FIG. 4, an embodiment may include executing logic 402 to select a limit for the cost of executing a query on the set of data, and logic block 404 to compare the estimated cost of executing the query on the set of data to the selected limit for the cost of executing a query on the set of data. In this embodiment, logic to execute the query can include logic block 406 to execute the query on the set of data responsive to logic block 404 comparing the estimated cost of executing the query on the set of data to the selected limit for the cost of executing the query on the set of data. In the event logic block 404 determines the estimated cost of executing the query on the set of data exceeds the selected limit for the cost of the cost of executing the query, logic block 404 can notify the entity seeking to execute the query via an interface of the system (e.g., an API, webAPI, REST API, or user interface). For example, logic block 404 can notify a user via a user interface that the estimated cost to execute the query exceeds the selected limit for the cost of the query and that the query therefore will not be executed. Additionally, or alternatively, logic block 404 can delay execution of the query for a period of time according to a throttling algorithm or according to a rate-limiting algorithm that limits the number of queries that can be executed against the set of data within a specified time period, or notifies the requesting entity (e.g., a user) of the cost incurred to execute the query and/or notifies the requesting entity that cost incurred to execute the query exceeds a cost limit according to a Costs Of Goods Sold (COGS) bounding algorithm and prompts for input to authorize and/or pay or change/increase subscription fees or service level before proceeding with executing the query.

Referring again to FIG. 1, logic block 108 can execute the query on the set of data responsive to the estimated cost of executing the query. In an example embodiment, the logic block can execute the query on the set of data responsive to the estimated cost of executing the query and one or more of: a throttling algorithm that controls when to execute the query against the set of data, a rate-limiting algorithm that limits a number of queries that can be executed against the set of data within a specific time period, and a Cost Of Goods Sold (COGS) bounding algorithm that tracks a cost incurred to execute the query against the set of data.

In the discussion above, "cost" is generally referred to as the computational cost to retrieve an estimated number of bytes of data from a set of data in response to a query. However, it is appreciated that the logic block that executes to estimate the cost of executing the query can include logic that estimates a computational cost to the system of executing the query and/or a financial or dollar cost to a user or organization for executing the query. Associating a financial cost can be useful if the user submitting the query has a subscription service that limits the amount of data that can be read from the data set, or that incurs additional charges based on exceeding certain usage limits.

Figure 5:
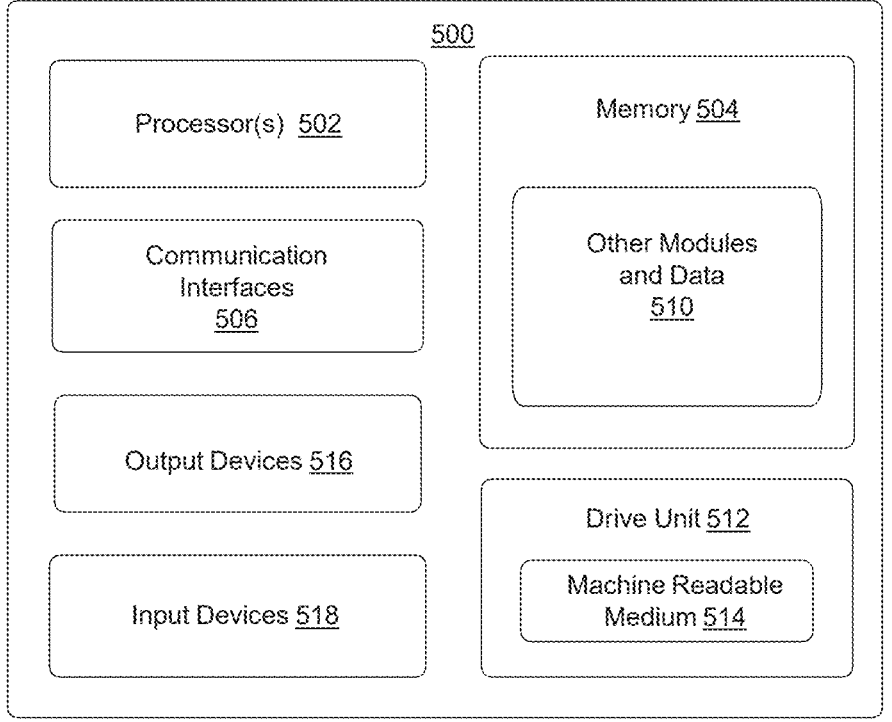
FIG. 5 illustrates an example architecture for a computing device capable of carrying out an embodiment of the invention.

FIG. 5 depicts an example architecture for a computing device 500 that can carry out embodiments of the invention. The computing device 500 can be one or more computing devices, such as a workstation, a personal computer (PC), a laptop computer, a tablet computer, a personal digital assistant (PDA), a cellular phone, a media center, an embedded system, a server or server farm, multiple distributed server farms, a mainframe, or any other type of computing device. As shown in FIG. 5, computing device 500 can include processor(s) 502, memory 504, communication interface(s) 506, output devices 516, input devices 518, and/or a drive unit 512 including a machine readable medium 514.

In various examples, the processor(s) 502 can be a central processing unit (CPU), a graphics processing unit (GPU), or both CPU and GPU, or any other type of processing unit, Each of the one or more processor(s) 502 may have numerous arithmetic logic units (A LLs) that perform arithmetic and logical operations, as well as one or more control units (CUs) that extract instructions and stored content from processor cache memory, and then executes these instructions by calling on the ALUs, as necessary, during program execution. The processor(s) 502 may also be responsible for executing drivers and other computer-executable instructions for applications, routines, or processes stored in the memory 504, which can be associated with common types of volatile (RAM) and/or nonvolatile (ROM) memory.

In various examples, the memory 504 can include system memory, which may be volatile (such as RAM), non-volatile (such as ROM, flash memory, etc.) or some combination of the two. Memory 504 can further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the computing device 500. Any such non-transitory computer-readable media may be part of the computing device 500.

The memory 504 can store data, including computer-executable instructions. The memory 504 can also store any other modules and data 510 that can be utilized by the computing device 500 to perform or enable performing any action taken by the computing device 500 or in connection with one or more user accounts. For example, the modules and data can be a platform, operating system, and/or applications, as well as data utilized by the platform, operating system, and/or applications.

The communication interfaces 506 can link the computing device 500 to other elements through wired or wireless connections. For example, communication interfaces 506 can be wired networking interfaces, such as Ethernet interfaces or other wired data connections, or wireless data interfaces that include transceivers, modems, interfaces, antennas, and/or other components, such as a Wi-Fi interface. The communication interfaces 506 can include one or more modems, receivers, transmitters, antennas, interfaces, error correction units, symbol coders and decoders, processors, chips, application specific integrated circuits (ASICs), programmable circuit (e.g., field programmable gate arrays), software components, firmware components, and/or other components that enable the computing device 500 to send and/or receive data, with the communication interface 506.

The output devices 516 can include one or more types of output devices, such as speakers or a display, such as a liquid crystal display. Output devices 516 can also include ports for one or more peripheral devices, such as headphones, peripheral speakers, and/or a peripheral display. In some examples, a display can be a touch-sensitive display screen, which can also act as an input device 518.

The input devices 518 can include one or more types of input devices, such as a microphone, a keyboard or keypad, and/or a touch-sensitive display, such as the touch-sensitive display screen described above.

The drive unit 512 and machine readable medium 514 can store one or more sets of computer-executable instructions, such as software or firmware, that embodies any one or more of the methodologies or functions described herein. The computer-executable instructions can also reside, completely or at least partially, within the processor(s) 502, memory 504, and/or communication interface(s) 506 during execution thereof by the computing device 500. The processor(s) 502 and the memory 504 can also constitute machine readable media 514.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method performed by a system having at least a processor and a memory therein to execute instructions for estimating a cost of querying a set of data maintained in an electronic data store accessible to the system, the set of data having a varying plurality of records each comprising a plurality of datum at least one of which varies in size, the method comprising:

executing logic to continually or repeatedly estimate a current shape of the set of data maintained in the electronic data store, including executing logic to estimate a current size of each of the plurality of datum in the plurality of records in the set of data;

receiving via an interface of the system a query specifying: a value for a first datum in the plurality of records in the set of data, a selection of an additional one or more of the plurality of datum in the plurality of records in the set of data, and a maximum number of first datum to be retrieved from the plurality of records in the set of data that have a value that matches the specified value for the first datum;

executing logic to estimate a cost of executing the query based on the maximum number of first datum to be retrieved from the plurality of records in the set of data that have the value that matches the specified value for the first datum, the selected additional one or more of the plurality of datum in the plurality of records in the set of data, and the estimated current size of the first datum and each of the selected additional one or more of the plurality of datum in the plurality of records in the set of data obtained from the estimated current shape of the set the data; and executing the query on the set of data responsive to the estimated cost of executing the query.

2. The computer-implemented method of claim 1, wherein executing logic to estimate the current size of each of the plurality of datum in the plurality of records in the set of data comprises executing logic to estimate the current size of each of the plurality of datum across a plurality of sample records in the set of data.

3. The computer-implemented method of claim 2, wherein executing logic to estimate the current size of each of the plurality of datum across the plurality of sample records in the set of data comprises executing logic to estimate the current size of each of the plurality of datum across a plurality of uniformly distributed and randomly chosen sample records in the set of data.

4. The computer-implemented method of claim 2, wherein executing logic to estimate the current size of each of the plurality of datum across the plurality of sample records in the set of data comprises executing logic to estimate one of a mean, a median, and a mode, for the current size of at least one datum across the plurality of sample records in the set of data.

5. The computer-implemented method of claim 1, wherein executing logic to estimate the cost of executing the query based on the maximum number of first datum to be retrieved from the plurality of records in the set of data that have the value that matches the specified value for the first datum, the selected additional one or more of the plurality of datum in the plurality of records in the set of data, and the estimated current size of the first datum and each of the selected additional one or more of the plurality of datum in the plurality of records in the set of data obtained from the estimated current shape of the set of data, comprises executing logic to estimate a number of bytes to be fetched from the electronic data store to execute the query on the set of data.

6. The computer-implemented method of claim 2, wherein executing logic to estimate the cost of executing the query based on the maximum number of first datum to be retrieved from the plurality of records in the set of data that have the value that matches the specified value for the first datum, the selected additional one or more of the plurality of datum in the plurality of records in the set of data, and the estimated current size of the first datum and each of the selected additional one or more of the plurality of datum in the plurality of records in the set of data obtained from the estimated current shape of the set of data, comprises:

executing logic to estimate a current size of the first datum and each of the selected additional one or more of the plurality of datum based on the estimated current size of each of the plurality of datum across the plurality of sample records in the set of data;

executing logic to sum the estimated current size of the first datum and the estimated current size of each of the selected additional one or more of the plurality of datum in the plurality of records in the set of data; and executing logic to multiply the summed estimated current size of the first datum and each of the selected additional one or more of the plurality of datum in the plurality of records in the set of data by the maximum number of first datum to be retrieved from the plurality of records in the set of data that have the value that matches the specified value for the first datum.

7. The computer-implemented method of claim 1, further comprising executing logic to compare the estimated cost of executing the query on the set of data to a selected limit for a cost of executing a query on the set of data; and wherein executing the query on the set of data comprises executing the query on the set of data where the estimated cost of executing the query on the set of data is less than the selected limit for the cost of executing the query on the set of data.

8. The computer-implemented method of claim 7, wherein executing the query on the set of data comprises, where the estimated cost of executing the query on the set of data is greater than the selected limit for the cost of executing the query on the set of data, one or more of:

transmitting a notification via the interface of the system that the estimated cost of executing the query on the set of data exceeds the selected limit for the cost of executing the query on the set of data;

delaying executing the query on the set of data for a period of time;

scheduling executing the query on the set of data according to a limit on a number of queries that can be executed against the set of data within a specified time period; and transmitting a request for input to authorize or pay a fee to execute the query on the set of data.

9. The computer-implemented method of claim 1 wherein executing the query on the set of data comprises executing the query on the set of data responsive to the estimated cost of executing the query and one or more of: a throttling algorithm that controls when to execute the query against the set of data, a rate-limiting algorithm that limits a number of queries that can be executed against the set of data within a specific time period, and a Cost Of Goods Sold (COGS) bounding algorithm that tracks a cost incurred to execute the query against the set of data.

10. The computer-implemented method of claim 1, wherein executing logic to estimate the cost of executing the query comprises executing logic to estimate at least one of a computational cost to the system of executing the query and a dollar cost to a user or organization for executing the query.

11. A computer system, comprising:

one or more processors;

a memory to store computer-executable instructions that, when executed by the one or more processors, cause the one or more processors to execute instructions for estimating a cost of querying a set of data maintained in an electronic data store accessible to the system, the set of data having a varying plurality of records each comprising a plurality of datum at least one or which varies in size, the method comprising:

executing logic to continually or repeatedly estimate a current shape of the set of data maintained in the electronic data store, including executing logic to estimate a current size of each of the plurality of datum in the plurality of records in the set of data;

receiving via an interface of the system a query specifying: a value for a first datum in the plurality of records in the set of data, a selection of an additional one or more of the plurality of datum in the plurality of records in the set of data, and a maximum number of first datum to be retrieved from the plurality of records in the set of data that have a value that matches the specified value for the first datum;

executing logic to estimate a cost of executing the query based on the maximum number of first datum to be retrieved from the plurality of records in the set of data that have the value that matches the specified value for the first datum, the selected additional one or more of the plurality of datum in the plurality of records in the set of data, and the estimated current size of the first datum and each of the selected additional one or more of the plurality of datum in the plurality of records in the set of data obtained from the estimated current shape of the set of data; and executing the query on the set of data responsive to the estimated cost of executing the query.

12. The computer system of claim 11, wherein executing logic to estimate the current size of each of the plurality of datum in the plurality of records in the set of data comprises executing logic to estimate the current size of each of the plurality of datum across a plurality of sample records in the set of data.

13. The computer system of claim 12, wherein executing logic to estimate the current size of each of the plurality of datum across the plurality of sample records in the set of data comprises executing logic to estimate the current size of each of the plurality of datum across a plurality of uniformly distributed and randomly chosen sample records in the set of data.

14. The computer system of claim 12, wherein executing logic to estimate the current size of each of the plurality of datum across the plurality of sample records in the set of data comprises executing logic to estimate one of a mean, a median, and a mode, for the current size of at least one datum across the plurality of sample records in the set of data.

15. The computer system of claim 11, wherein executing logic to estimate the cost of executing the query based on the maximum number of first datum to be retrieved from the plurality of records in the set of data that have the value that matches the specified value for the first datum, the selected additional one or more of the plurality of datum in the plurality of records in the set of data, and the estimated current size of the first datum and each of the selected additional one or more of the plurality of datum In the plurality of records in the set of data obtained from the estimated current shape of the set of data, comprises executing logic to estimate a number of bytes to be fetched from the electronic data store to execute the query on the set of data.

16. The computer system of claim 12, wherein executing logic to estimate the cost of executing the query based on the maximum number of first datum to be retrieved from the plurality of records in the set of data that have the value that matches the specified value for the first datum, the selected additional one or more of the plurality of datum in the plurality of records in the set of data, and the estimated current size of the first datum and each of the selected additional one or more of the plurality of datum in the plurality of records in the set of data obtained from the estimated current shape of the set of data, comprises:

executing logic to estimate a current size of the first datum and each of the selected additional one or more of the plurality of datum based on the estimated current size of each of the plurality of datum across the plurality of sample records in the set of data;

executing logic to sum the estimated current size of the first datum and the estimated current size of each of the selected additional one or more of the plurality of datum in the plurality of records in the set of data; and executing logic to multiply the summed estimated current size of the first datum and each of the selected additional one or more of the plurality of datum in the plurality of records in the set of data by the maximum number of first datum to be retrieved from the plurality of records in the set of data that have the value that matches the specified value for the first datum.

17. The computer system of claim 11, further comprising executing logic to compare the estimated cost of executing the query on the set of data to a selected limit for a cost of executing a query on the set of data; and wherein executing the query on the set of data comprises executing the query on the set of data responsive to comparing the estimated cost of executing the query on the set of data to the selected limit for the cost of executing the query on the set of data.

18. The computer system of claim 11, wherein executing the query on the set of data comprises executing the query on the set of data responsive to the estimated cost of executing the query and one or more of: a throttling algorithm that controls when to execute the query against the set of data, a rate-limiting algorithm that limits a number of queries that can be executed against the set of data within a specific time period, and a Cost Of Goods Sold (COGS) bounding algorithm that tracks a cost incurred to execute the query against the set of data.

19. The computer system of claim 11, wherein executing logic to estimate the cost of executing the query comprises executing logic to estimate at least one of a computational cost to the system of executing the query and a dollar cost to a user or organization for executing the query.

20. A non-transitory computer-readable medium storing computer-executable instructions that, when executed by one or more processors, cause the one or more processors to execute instructions for estimating a cost of querying a set of data maintained in an electronic data store accessible to the system, the set of data having a varying plurality of records each comprising a plurality of datum at least one of which varies in size, the method comprising:

executing logic to continually or repeatedly estimate a current shape of the set of data maintained in the electronic data store, including executing logic to estimate a current size of each of the plurality of datum in the plurality of records in the set of data;

receiving via an interface of the system a query specifying: a value for a first datum in the plurality of records in the set of data, a selection of an additional one or more of the plurality of datum in the plurality of records in the set of data, and a maximum number of first datum to be retrieved from the plurality of records in the set of data that have a value that matches the specified value for the first datum;

executing logic to estimate a cost of executing the query based on the maximum number of first datum to be retrieved from the plurality of records in the set of data that have the value that matches the specified value for the first datum, the selected additional one or more of the plurality of datum in the plurality of records in the set of data, and the estimated current size of the first datum and each of the selected additional one or more of the plurality of datum in the plurality of records in the set of data obtained from the estimated current shape of the set of data; and executing the query on the set of data responsive to the estimated cost of executing the query.

* * * * *